United States Patent Office 2,898,308
Patented Aug. 4, 1959

2,898,308

METHOD OF MANUFACTURING CATALYSTS

John W. Teter, Chicago, John L. Gring, Homewood, and Henry Erickson, Park Forest, Ill., assignors to Sinclair Refining Company, New York, N.Y., a corporation of Maine No Drawing. Application June 10, 1955
Serial No. 514,693

8 Claims. (Cl. 252—465)

This invention relates to an improved method for manufacturing catalysts which are useful in various reactions including hydrocarbon conversion reactions, particularly those conducted in the presence of free hydrogen. Certain of the catalysts of this invention are also useful in polymerization, olefin hydration and etherification reactions.

A great many alumina based catalysts have been employed in various chemical reactions. These catalysts have as the carrier or base material some form of alumina and their activity and aging characteristics in a given reaction are due not only to the catalytically active component deposited on the base but also due to the association of the catalytically active component with this particular base material. Although such catalysts have shown effectiveness in many reactions, they are particularly useful in hydrocarbon conversion reactions conducted in the presence of free hydrogen and to a lesser extent in oxidation reactions. Typical of reactions conducted in the presence of free hydrogen are hydrogenation, dehydrogenation, hydrodesulfurization, hydrocracking, hydrorefining and hydroforming. Feeds charged to these reactions are commonly petroleum-derived hydrocarbons.

There have been a number of methods described for preparing alumina based catalysts. Alumina particles in undried form or after partial or complete drying or even after calcination have been impregnated with aqueous salt solutions to add one or more components which will enhance catalytic activity. Frequently a dried or calcined alumina is impregnated with a solution of one component, re-dried, impregnated a second time to increase the percentage of the component or to introduce a second component, and again dried. Even more than two impregnations are sometimes used. These methods have disadvantages. For instance, the water-soluble salts employed are frequently expensive as compared with the cost of salts of low water solubility which, due to their solubility characteristics, generally find less uses in the chemical industry. Frequently the soluble salt is in the form of a nitrate and upon subsequent heating of the dried material noxious and corrosive nitrogen compounds are evolved which necessitate special equipment and represent a potential hazard to personnel.

Other anions introduced through use of the water-soluble catalytically active metal salts are equally disadvantageous. For example, chloride can be deleterious as it causes corrosion of processing equipment. To avoid these effects, operators have employed expensive and time-consuming washing operations to reduce the anion content. Also multiple impregnations, indicated above, require multiple dryings, thereby slowing production and increasing processing costs. Additions by impregnation may also result in higher percentage of components on some particles as compared to others.

When the catalytically active component is incorporated into the alumina structure by precipitation, various reagents have been employed as precipitants. Invariably these extraneous agents include undesirable catalyst constituents. For example, if a basic precipitant be employed, such as sodium hydroxide, sodium ions are introduced which may poison the catalyst, while if an acidic precipitant be employed the undesirable anions are present. Unless contaminating ions are subject to removal by heating during calcination, washing procedures are usually employed; however, it is sometimes difficult to wash without also partially removing a desired component.

In another method of preparing these catalysts precipitation of the alumina base and of the catalytically active component is effected simultaneously. This method is equally disadvantageous as those employing a preformed base and water-soluble salts, since the undesirable and poisoning cations and anions are again introduced which necessitates considerable water washing. Thus, all of these methods of preparing alumina based catalysts are disadvantageous in that they require relatively expensive reagents, extensive water washing, and complicated processing equipment which in many instances must be specifically designed for the particular catalyst manufactured.

In the present invention it has been found that valuable alumina based catalysts containing certain catalytically active components can be prepared from compounds of the catalytically active metal which are normally considered to be substantially water-insoluble. Due to the solubility characteristics of these compounds, they are normally less expensive by an appreciable factor and may be commercially available as process by-products. In this invention the substantially water-insoluble compounds are agitated in an aqueous medium with an alumina base until the desired constituents have essentially been adsorbed or interacted with the catalyst base. The catalytically active components which are deposited on the alumina base include metals of the iron transition group, i.e. cobalt, nickel and iron; the metals of the fifth and sixth period of group VIa, i.e. molybdenum and tungsten; vanadium and their various combinations. It is believed that the small but finite solubility of the substatially water-insoluble compounds of these metals provides effective transfer of the added component to the base material as X-ray and microscopical inspections of the resulting catalysts indicate combination of the catalytically active component with the base apparently through some reaction mechanism. As the substantially water-insoluble salts are usually offered as the carbonate, oxide, hydroxide or sulfide, undesirable extraneous ions are not introduced in the catalyst and thus little or no washing is necessary after impregnation of the base with the catalytically active component. Usable forms of these salts include the bicarbonates, basic carbonates and hydrated oxides. When using sulfides it can be advantageous to add a small amount of ammonia to the digestion mixture.

The catalyst can be made as, for instance, by agitating the alumina base and the substantially water-insoluble compounds of the catalytically active component in an aqueous medium for a time sufficient to effect transfer of an effective amount of the catalytic component to the base followed by separation of solids, drying and calcination. Temperatures suitable for calcination are usually in the range from about 800 to 1200° F. The composited base can be formed as by tableting or extruding as practiced in the art. Also, when the catalysts are to be used in fluid processing, the small particle form composited base can be employed in the finely divided form. It is seen that the present invention is directed to a process for manufacturing catalysts which employs relatively inexpensive chemical reagents and simplified processing steps materially reduce washing requirements which is adaptable to the manufacture of a variety of catalysts.

In the present method the alumina base which is stirred in the aqueous medium is in particle form or the gelatinous hydrogel form. Thus the alumina base can be in the form of dried or undried alumina hydrate or alumina hydrogel in gelatinous form or dried sufficiently to afford discrete particles, or the alumina can be calcined as to a moderate degree before interacting with the catalytically useful constituent or constituents. When particulate, the useful size of the alumina base particles can vary. Finely divided particles such as spray dried microspheres are preferred as they present large surface areas for deposition of the catalytically active component. As noted the alumina base can be any of the hydrate forms such as the monohydrate or trihydrate; for instance, an effective base comprises about 5 to 95% of trihydrate and about 95 to 5% of other hydrous aluminas in the form of alumina monohydrate, e.g. boehmite, as detected by X-ray analysis after drying or in the form of amorphous hydrous alumina or mixtures of these forms. A preferred base contains about 10 to 50% of the trihydrate and about 90 to 50% of the amorphous or monohydrate forms. The alumina base can contain minor amounts usually up to about 25% of promoting or stabilizing constituents as, for instance, silica, titania, zirconia, thoria, etc. Also, the aqueous medium for the alumina base and the catalytically active component can contain when desired minor amounts of non-aqueous constituents as, for instance, alcohols. Mother liquors separated from the impregnated alumina can be reused in slurrying additional base and metal compounds particularly to reduce loss of ions of the catalytically active component.

The catalytically active components which are deposited on the alumina base include metals of the iron transition group, i.e. cobalt, nickel and iron; the metals of the fifth and sixth period of group VI$a$, i.e. molybdenum and tungsten; vanadium and their various combinations. As noted, the catalytic component is deposited on the base through agitation in an aqueous medium of substantially water-insoluble metal salts which have a small but finite water-solubility; preferably salts such as the carbonates, oxides and hydroxide are employed. The added component on the base will be an amount sufficient to afford a substantial catalytic effect and will frequently comprise about 0.1 to 10 weight percent of the catalyst, but may be up to about 30 weight percent or more of the total catalyst composition. As examples of these catalysts which exhibit dehydrogenation activity are those which have nickel, molybdenum, tungsten, or their combinations deposited on the alumina base. Also these metals can be deposited in some sulfide form when slurried as the sulfide in the manufacturing procedure or sulfiding can be effected after the active component is deposited on the base material to produce hydrogenation catalysts. Other hydrogenation catalysts include those which on the alumina base have, for instance, nickel, cobalt-molybdena, nickel-molybdena, iron-nickel-molybdena, cobalt, molybdena, nickel-tungsten or nickel-vanadia. Of course, these various catalysts can exhibit other activities such as hydroforming, hydrodesulfurization, hydrorefining, etc. when treating certain charge stocks under appropriate reaction conditions.

As previously noted, the alumina base and the substantially water-insoluble compound of the catalytically active component are agitated in the aqueous medium for a time sufficient to effect deposition on the alumina base of an amount of metal component which affords a substantial catalytic effect. The time necessary to give this result can depend upon the material being deposited as well as the conditions of agitation, such as the temperature at which the slurry is digested, and in general will be at least about ten minutes. While the slurry is digesting, it is stirred and preferably is at a temperature from about 125° to about 190° F. or to about 212° F. which affords more effective deposition of the active component on the base. Higher temperatures, even above 212° F., could be employed; however, no particular advantage is associated with their utilization which overcomes the necessity for employing superatmospheric pressures to maintain the slurry by keeping the water in the liquid phase. Lower temperatures such as room temperature and somewhat below can also be employed, for instance cobalt and molybdenum are effectively deposited on the alumina base when cobalt carbonate, molybdenum trioxide and the alumina base are digested at room temperature in the aqueous slurry with agitation for six hours. When cobalt carbonate alone is slurried with the alumina base under the same conditions in the absence of molybdenum trioxide, deposition of cobalt on the base is very slow. On the other hand, cobalt can be deposited on the base in a more feasible digestion time even in the absence of molybdenum trioxide when the temperature is at 160° F. Thus the selection of digestion conditions will depend upon several factors.

The following specific examples will serve to illustrate the present invention; however, they should not be considered limiting.

EXAMPLE I

A three-necked round bottomed flask was fitted with a heating mantle, thermometer, stirrer, and water-cooled condenser. One liter of water was added to the flask and stirring and heating were started. 322 grams of spray dried microspherical alumina (surface area of about 244 square meters/gram, calculated on ignited basis, and containing approximately 37% by weight of alumina trihydrate and approximately 38% by weight of a form which corresponds to boehmite as detected by X-ray diffraction techniques) were added. This microspherical alumina showed 31.8 weight percent loss on ignition. The temperature of the resulting slurry was brought to 160° F. To the heated slurry were added 13.6 grams of cobalt carbonate and stirring was continued for 6 hours at 160° F. The mother liquor was then filtered from the solid phase. The filter cake was dried at 230° F. and impregnated with 225 milliliters of a solution of 27.5 grams of ammonium paramolybdate in water and the solids were redried at 230° F. The dried solids were mixed with Sterotex die lubricant and tableted to 1/8" x 1/8" size. The tablets were calcined for 6 hours in air at 900° F. in an electric muffle furnace which was brought to calcination temperature in 3 hours. The resulting catalyst analyzed (ignited basis) 2.43 weight percent Co, 5.72 weight percent Mo, 0.02 weight percent Na, and 1.16 weight percent V.M. at 1200° F.

EXAMPLE II

To a reaction flask as fitted in Example I was added 1 liter of water and stirring and heating were started. 322 grams of spray dried microspherical alumina, as employed in Example I, 13.6 grams of cobalt carbonate, and 22.5 grams of molybdenum trioxide (A.R. grade) were added and the temperature of the resulting slurry brought to 160° F. Heating and stirring of the slurry were continued for 6 hours at 160° F. The mother liquor was filtered from the solid phase and the filter cake was oven dried at 230° F. The oven dried filter cake was mixed with Sterotex die lubricant, tableted to 1/8" x 1/8" size and calcined for 6 hours in air at 900° F. in an electric muffle furnace which was brought to calcination temperature in 3 hours. The resulting catalyst analyzed (ignited basis) 2.03 weight percent cobalt, 5.48 weight percent molybdenum, 0.02 weight percent sodium, and 1.34 weight percent V.M. at 1200° F. The catalyst had a surface area (BET) of 329 square meters per gram and analyzed 0.438 cc. per gram total pore volume. An X-ray pattern was made of the catalyst and it showed gamma-alumina plus an unidentified line corresponding to 3.08 Angstrom units spacing. However, patterns indicative of either cobalt carbonate or molybdenum trioxide were absent.

In a duplicate of this example the filtrate analyzed on a per liter basis 0.52 gram cobalt, 0.39 gram molybdenum and 0.09 gram carbon dioxide. The filter cake analyzed on a volatile free basis 2.02 weight percent cobalt, 5.48 weight percent molybdenum and 0.13 weight percent carbon dioxide.

EXAMPLE III

To a flask as fitted in Example I was added 1 liter of water and stirring and heating were started. 322 grams of spray dried microspherical alumina of Example I, 12.7 grams of nickel carbonate (C.P. grade) and 22.5 grams of molybdenum trioxide (A.R. grade) were added, and the temperature of the resulting slurry was brought to 160° F. The slurry was stirred for 6 hours while maintained at a temperature of 160° F. The mother liquor was then filtered from the solid phase and the solid filter cake was oven dried at 230° F. The dried filter cake was mixed with Sterotex die lubricant, tableted to 1/8" x 1/8" size, and calcined for 6 hours in air at 900° F. in an electric muffle furnace which was brought to calcination temperature in 3 hours. The resulting catalyst analyzed (ignited basis) 2.48 weight percent nickel, 5.59 weight percent molybdenum, 0.02 weight percent sodium and 1.77 weight percent V.M. at 1200° F.

EXAMPLE IV

To a flask as fitted in Example I was added 1 liter of water and stirring and heating were started. 322 grams of spray dried microspherical alumina of Example I, 12 grams of dried ferric hydroxide and 22.5 grams of molybdenum trioxide (A.R. grade) were added and the temperature of the resulting slurry was brought to 160° F. with stirring. Stirring of the resulting slurry was continued for 6 hours at 160° F. The mother liquor was then filtered from the solid phase and the filter cake was oven dried at 230° F. The filter cake was mixed with Sterotex die lubricant, tableted to 1/8" x 1/8" size and calcined for 6 hours in air at 900° F. in an electric muffle furnace which was brought to calcination temperature in 3 hours. The resulting catalyst analyzed (ignited basis) 2.43 weight percent iron, 5.66 weight percent molybdenum, and 0.57 weight percent V.M. at 1200° F.

EXAMPLE V

To a flask as fitted in Example I was added 1 liter of water and stirring and heating were started. 319 grams of uncalcined molybdena-alumina microspheres which analyzed (ignited basis) 11.16 weight percent $MoO_3$, 1.41 weight percent $SiO_2$, and 24.4 weight percent V.M. at 1200° F. were added. The surface area (BET) of this base material was about 216 square meters per gram. 13.6 grams of cobalt carbonate were also added to the flask and the resulting slurry was brought to 160° F. with stirring. Stirring of the slurry was continued for 6 hours at 160° F. The mother liquor was then filtered from the solid phase and the filter cake was oven dried at 230° F. The dried filter cake was mixed with Sterotex die lubricant, tableted to 1/8" x 1/8" size, and calcined for 6 hours in air at 900° F. in an electric muffle furnace which was brought to calcination temperature in 3 hours. The resulting catalyst analyzed (ignited basis) 2.35 weight percent cobalt, 6.58 weight percent molybdenum, 2.59 weight percent V.M. at 1200° F.

EXAMPLE VI

To a flask as fitted in Example I was added 1 liter of water and stirring and heating were started. 247 grams of calcined molybdena-alumina microspheres, and 13.6 grams of cobalt carbonate were added to the flask and the temperature of the resulting slurry was brought to 160° F. Stirring was continued for 6 hours with the slurry at this temperature. The mother liquor was filtered from the solid phase and the filter cake was oven dried at 230° F. The dried filter cake was mixed with Sterotex die lubricant, tableted to 1/8" x 1/8" size, and calcined for 6 hours in air at 900° F. in an electric muffle furnace which was brought to calcination temperature in 3 hours. The resulting catalyst analyzed (ignited basis) 2.25 weight percent cobalt, 5.58 weight percent molybdenum and 0.03 weight percent V.M. at 1200° F.

This preparation illustrates the usefulness of the present invention in depositing the catalytically active components on a calcined base and microscopic examination of the digested slurry indicated that reaction of the active components and the base took place satisfactorily.

EXAMPLE VII

To a flask as fitted in Example I was added 1 liter of water and stirring was begun. 322 grams of spray dried microspherical alumina of Example I, 13.6 grams of cobalt carbonate and 22.5 grams of molybdenum trioxide (A.R. grade) were added and the temperature of the resulting slurry was 74° F. (room temperature). Stirring of the slurry at room temperature was continued for 6 hours. The mother liquor was then filtered from the solid phase and the filter cake was oven dried at 230° F. The filtrate analyzed on a per liter basis 0.5 gram cobalt, 0.63 gram molybdenum. The dried filter cake was mixed with Sterotex die lubricant, tableted to 1/8" x 1/8" size, and calcined for 6 hours in air at 900° F. in an electric muffle furnace which was brought to calcination temperature in 3 hours. The resulting catalyst analyzed (ignited basis) 1.96 weight percent cobalt, 5.35 weight percent molybdenum, 0.02 weight percent sodium, and 0.88 weight percent V.M. at 1200° F. The catalyst had a surface area (BET) of 305 square meters per gram, calculated on ignited basis, and its total pore volume was 0.449 cc. per gram. An X-ray pattern of this catalyst was made and showed gamma-alumina. Thus the preparation at room temperature resulted in a different catalyst than Example II; nevertheless microscopical examination before filtering indicated absence of the original cobalt carbonate and molybdenum trioxide particles.

EXAMPLE VIII

To a flask as fitted in Example I was added 1 liter of water and stirring and heating were started. 294 grams of spray dried microspherical alumina of Example I, 9.8 grams of nickel carbonate (C.P. grade) and 42.8 grams of tungstic acid (C.P. grade, $WO_3 \cdot H_2O$) were added and the temperature of the resulting slurry brought to 160° F. Stirring was continued for 6 hours with the slurry at this temperature. The mother liquor was then filtered from the solid phase and the filter cake was oven dried at 230° F. The filtrate analyzed on a per liter basis 0.17 gram of nickel, 0.02 gram of tungsten, and 0.05 gram of carbon dioxide. The dried filter cake was mixed with Sterotex die lubricant, tableted to 1/8" x 1/8" size, and calcined for 6 hours in air at 900° F. in an electric muffle furnace which was brought to calcination temperature in 3 hours. The resulting catalyst analyzed (ignited basis) 1.68 weight percent nickel, 12.9 weight percent tungsten and 0.59 weight percent V.M. at 1800° F. An X-ray diffraction pattern of the catalyst was made and indicated gamma-alumina plus a weak unknown pattern; the lines were rather sharp. It was indicated by microscopical examination before filtering that the catalytically active components had combined with the base apparently through some reaction mechanism.

EXAMPLE IX

To a flask as fitted in Example I, except of larger capacity, was added 3 liters of water and stirring and heating were started. 1932 grams of spray dried microspherical alumina of Example I, 90 grams (reagent grade) of cobalt carbonate, and 149 grams of molybdenum trioxide (A.R. grade) were added and the temperature of the resulting slurry brought to 160° F. Stirring was continued for 6 hours with the slurry at this temperature. The mother liquor was then filtered from the solid phase and the filter cake was oven dried at 230° F. The filtrate, analyzed on a per liter basis 0.98 gram cobalt, 0.69 gram molybdenum, and 0.02 gram carbon dioxide. The dried filter cake was processed by extrusion into particles about $\frac{1}{16}''$ in diameter and cut in about $\frac{1}{8}''$ lengths. The particles were calcined for 6 hours in air at 900° F. in an electric muffle furnace which was brought to calcination temperature in 3 hours. The resulting catalyst analyzed (ignited basis) 2.94 weight percent cobalt, 6.2 weight percent molybdenum and 0.82 weight percent V.M. at 1200° F.

EXAMPLE X

To a flask as fitted in Example I was added 1 liter of water and heating and stirring were begun. 330 grams of spray dried microspherical alumina of Example I and 25 grams of molybdenum trioxide (A.R. grade) were added and the temperature of the resulting slurry brought to 160° F. Stirring was continued for 6 hours with the slurry at this temperature. The mother liquor was then filtered from the solid phase and the filter cake was oven dried at 230° F. The filtrate analyzed on a per liter basis 0.10 gram molybdenum and had a pH of 5.5. The dried filter cake was calcined for 6 hours in air at 1200° F. The resulting catalyst analyzed (ignited basis) 6.6 weight percent molybdenum and 0.9 weight percent V.M. at 1200° F.

EXAMPLE XI

To a flask as fitted in Example I were added 1250 milliliters of water and stirring and heating were started. 573 grams of spray dried microspherical alumina of Example I, 50.6 grams of nickel carbonate (C.P. grade) and 109.5 grams of vanadium pentoxide (purified grade) were added and the temperature of the resulting slurry brought to 160° F. Stirring was continued for 6 hours with the slurry at this temperature. The mother liquor was then filtered from the solid phase and the filter cake was oven dried at 230° F. The filtrate analyzed on a per liter basis 3.69 grams of nickel and 7.72 grams of vanadium pentoxide. The dried filter cake was tableted to $\frac{1}{16}'' \times \frac{1}{16}''$ size using Sterotex die lubricant and later calcined for 6 hours in air at 900° F. in an electric muffle furnace which was brought to calcination temperature in 3 hours. The resulting catalyst analyzed (ignited basis) 3.87 weight percent nickel, 10.38 weight percent vanadium and 2.26 weight percent V.M. at 1800° F. It was indicated by microspherical examination before filtering that nickel and vanadium had been transferred to the alumina base apparently through some reaction mechanism.

EXAMPLE XII

To a flask as fitted in Example I was added 1 liter of water and stirring and heating were started. 322 grams of spray dried microspherical alumina of Example I were added and the temperature was raised to 160° F. 10.23 grams of cobalt oxide hydrate (61.1 weight percent Co) and 22.5 grams molybdenum trioxide (A.R. grade) were then added, and stirring was continued for 6 hours with the slurry at 160° F. The mother liquor was then filtered from the solid phase and the filter cake was oven dried at 230° F. The dried filter cake was mixed with Sterotex die lubricant, tableted into $\frac{1}{8}'' \times \frac{1}{8}''$ size and calcined for 6 hours in air at 900° F. in an electric muffle furnace which was brought to calcination temperature in 3 hours. The resulting catalyst analyzed (ignited basis) 2.2 weight percent cobalt, 5.7 weight percent molybdenum and 2.0 weight percent V.M. at 1200° F.

EXAMPLE XIII

To a flask as fitted in Example I were added 1 liter of water and 573 grams of spray dried microspherical alumina of Example I and the flask contents were heated to boiling with stirring. 45 grams of molybdenum trioxide (A.R. grade) were added and 27.2 grams of cobalt carbonate were added in small increments to avoid excessive foaming. Stirring was continued for 0.5 hour with the slurry between 205° and 212° F. The mother liquor was then filtered from the solid phase and the filter cake was oven dried at 230° F. The dried filter cake was mixed with Sterotex die lubricant, tableted into $\frac{1}{8}'' \times \frac{1}{8}''$ size and calcined for 6 hours in air at 900° F. in an electric muffle furnace which was brought to calcination temperature in 3 hours. The resulting catalyst analyzed (ignited basis) 2.22 weight percent cobalt, 6.15 weight percent molybdenum and 1.05 weight percent V.M. at 1200° F. Microscopical examination before filtering indicated combination of cobalt and molybdenum with the base apparently through some reaction mechanism.

EXAMPLE XIV

To a flask as fitted in Example I were added 1 liter of water and 573 grams of spray dried microspherical alumina of Example I and the flask contents were heated to boiling with stirring. 45 grams of molybdenum trioxide (A.R. grade) were added followed by 20.5 grams of cobalt oxide hydrate (61.1 weight percent Co). The cobalt oxide hydrate was added at one time as it allows the use of high temperature without foaming. Stirring was continued for 0.5 hour with the slurry between 205° and 212° F. By microscopical examination the cobalt oxide hydrate appeared to be reacted in 10 minutes. The mother liquor was then filtered from the solid phase and the filter cake was oven dried at 230° F. The dried filter cake was mixed with Sterotex die lubricant, tableted into $\frac{1}{8}'' \times \frac{1}{8}''$ size and calcined for 6 hours in air at 900° F. in an electric muffle furnace which was brought to calcination temperature in 3 hours. The resulting catalyst analyzed (ignited basis) 2.24 weight percent cobalt, 6.13 weight percent molybdenum and 1.08 weight percent V.M. at 1200° F.

EXAMPLE XV

A large scale batch of catalyst prepared by the present invention was prepared by using a 100 gallon stainless steel kettle heated by means of 100 p.s.i.g. steam passed through stainless steel coils in the kettle. The kettle contents were agitated by two air driven stirrers each fitted with a cage beater mounted above a propeller. In a first preparation, 485 lbs. of spray dried alumina hydrate (equivalent to 172 lbs. $Al_2O_3$) containing approximately 30 to 35 weight percent of trihydrate were dispersed in 34 gallons of water at 130° F. and the alumina hydrate and water were agitated for 1 hour as a slurry. The well dispersed slurry was found to contain 2.44 lbs. of solids per gallon of slurry at 165° F. 3½ hours were required for the solids determination and during this time the slurry was vigorously stirred and held at temperatures between 130° and 205° F. Two separate slurries each about 2½ gallons in volume were prepared from 17.62 lbs. of molybdenum trioxide and 10.9 lbs. of cobalt carbonate, respectively, and water. These slurries were simultaneously added to the reaction kettle over about a two-minute interval. The temperature of the alumina hydrate slurry at the time of adding the molybdenum trioxide and cobalt carbonate slurries was 180° F. After addition of the latter slurries to the alumina hydrate slurry there was vigorous evolution of carbon dioxide with no foaming and the evolution continued for about 10 minutes. At this time microscopic examination of the slurry showed no solid cobalt carbonate or molybdena. The reaction slurry was then maintained at 178 to 180° F. for 70 minutes with stirring. The slurry was filtered in a plate and frame filter press using cloth-backed paper as a filter means. During filtering a slight loss of fines was noted and each press load of cake was air blown to dry partially the cake. Filtration of the slurry required about 4 hours during which time the portion of the slurry remaining in the kettle was stirred but not heated. The weight of filter cake obtained was 486.5 lbs. The filter cake was then placed in depths of 2 to 4 inches in stainless steel trays and dried in a forced air oven at 180° F. for 6 to 10 hours. To expedite drying and to improve uniformity, the cake was thoroughly mixed at intervals. The cake was removed from the drier when the weight loss indicated 43 to 44% of free water (volatile at 120° C.) and the weight of the dried cake was 390 lbs.

In a second preparation the procedure for combining the alumina hydrate and the cobalt and molybdenum components was that employed in making the first preparation except that the following conditions were observed.

*Preparation 2*

Materials used:
- Alumina hydrate, lbs. _____ 299
- Gals. of water for hydrate slurry___ 21 at 150° F.
- $Al_2O_3$, lb./gal. of slurry _____ 2.21 at 130° F.
- Total lbs. $Al_2O_3$ _____ 98.6
- $MoO_3$, lbs. _____ 10.1
- Gals. of $MoO_3$ slurry _____ 2
- Cobalt carbonate, lbs. _____ 6.35
- Gals. of cobalt carbonate slurry _____ 2

Dispersion of hydrate:
- Time, hrs. _____ 3⅔
- Temp., ° F. _____ 130–183

Digestion of $Al_2O_3$-"$CoCo_3$"-$MoO_3$ slurry:
- Time, mins. _____ 60
- Temp., ° F. _____ 178–182

Filtration:
- Total time, hrs. _____ 3
- Wt. of filter cake, lbs. _____ 301.1

Drying:
- Air Temp. of oven, ° F. _____ 180
- Drying time, hrs. _____ 6–10
- Wt. of dried cake, lbs. _____ 235.8

The dried solids of the first and second preparations were mixed in 55 gallon drums and batches were prepared for extrusion by mulling 12-lb. samples of the dried blend for 3 minutes in a Simpson Intensive Mixer, adding 300 mls. of water and mulling for 12 minutes. Grab samples of the various mixtures indicated a moisture content (volatile at 120° C.), of 43 to 46 weight percent and subsequently the drier mixes were employed in making ⅛" diameter extruded particles.

216 lbs. of mulled material was extruded as ¹⁄₁₆" diameter particles. These particles were dried overnight in forced air ovens at 180° F. and the dried product was broken to approximately ⅛" lengths by hand. Upon screening, the yield was 4 lbs. of less than 16 mesh fines and 137 lbs. of sized particles containing 41 weight percent moisture (volatile at 1000° F.).

204 lbs. of the mulled blend of the first and second preparations were formed by extrusion into ⅛" diameter particles, being cut to approximately ⅛" lengths by a wire cutter as the catalyst emerged from the extruder die plate. Immediately upon cutting the extruded particles were screened and 10 to 15 weight percent of less than 6 mesh fines were recycled to the extruder. The extruded particles were dried overnight in a forced air oven at 180° F. and the yield was 131.8 lbs. of oven dried product (30 weight percent moisture, volatile at 1000° F.) which when screened gave 128.5 lbs. of sized particles and 3 lbs. of less than 12 mesh fines.

204 lbs. of the mulled blend of the first and second preparations were formed into extruded particles using a die plate having holes ⁷⁄₆₄" in diameter. The extruded particles were dried overnight in a forced air oven at 180° F. to 135.8 lbs. of dried product. The extruded material was broken by hand to lengths of approximately ⅛" and the broken particles were screened to give 11.8 lbs. of less than 12 mesh fines and 124 lbs. of sized particles containing 35 weight percent moisture (volatile at 900° F.).

After a small amount of material was removed for calcination studies from each of the batches of dried particles, the remaining portions of these batches were calcined in a commercially sized Bartlett and Snow indirect fired rotary kiln. The kiln drum was about 36' long and had about a 3' inside diameter. The drum rotated at 2⅛ revolutions per minute and sloped toward the discharge end ¹⁄₁₆" per foot of length. The catalyst was fed to the drum by means of a screw conveyor and spiral flights in the feed end of the drum rapidly advanced the catalyst to the heated zone. The catalyst discharged through a cooling section which reduced the temperature to about 150° F. Temperatures were recorded from three thermocouples in the combustion gas zone opposite from the gas burners and no means of obtaining temperatures within the kiln were available. All dampers were closed to maintain minimum air flow through the kiln. Catalyst discharged in less than 2 hours was recycled to insure a minimum of 2 hours residence time. Visual examination indicated essentially no attrition of the catalyst during calcination. Data obtained during the calcinations was as follows:

*Rotary kiln calcination data*

| Calcination Number | 1 | 2 | 3 |
| --- | --- | --- | --- |
| Extrudate diameter, inches | ⁷⁄₆₄ | ¹⁄₁₆ | ⅛ |
| Wt. of extrudate charged to kiln, lbs. | 123.5 | approx. 135 | 127.5 |
| Wt. of catalyst recycled, lbs. | 52.5 | 53.38 | 44.0 |
| Time in kiln, hrs. | 2 to 5¼ | 2 to 4½ | 2 to 4¼ |
| Temp. range, ° F. (combustion zone) | 990–1,100 | 1,000–1,080 | 1,020–1,070 |
| Wt. of catalyst recovered, lbs. | 73 | 88 | 71.5 |

Catalyst made in this preparation exhibits good activity, aging resistance and regenerative ability in operations for desulfurizing fluid catalytic light cycle oil. As an example the ¹⁄₁₆" extruded catalyst shows a comparative activity of 124 taking for 100 a commercially available desulfurization catalyst as the basis.

The activity of catalysts prepared by the method of the present invention has been further illustrated. For instance, the desulfurization activity of each of the catalysts of Examples II, VII, IX and XII was exhibited by treating for 6 hours a sour heating oil (boiling range, 348 to 667° F., 0.79 weight percent sulfur) from a West Texas crude at 10 WHSV (space velocity in weight of feed per weight of catalyst per hour), 680° F. and 500 p.s.i.g. while recycling 3500 cubic feet of overhead gases (basis 60° F. and 0 p.s.i.g.) per barrel of feed. The overhead gases were predominantly hydrogen (95 plus volume percent $H_2$) with hydrogen sulfide removed before charging to the reactor, and enough fresh hydrogen was added to maintain the pressure. Each of these catalysts exhibited desulfurization activity.

The catalyst of Example II showed good aging stability in an accelerated desulfurization aging run. Operating conditions in this run were 760° F., 450 p.s.i.g., 7.8 WHSV and 700 standard cubic feet of recycle gas per barrel of feed with hydrogen sulfide removed from the recycle gases. The feed stock was a fluid catalytic light cycle oil of 23.8 API gravity having a boiling range of about 416 to 611° F. and containing about 2.0 weight percent of sulfur. After 15 hours of processing the weight percent of sulfur removed from the feed was about 77 percent and after about 200 hours about 60 weight percent of the sulfur was being removed.

It is claimed:

1. In a method of catalyst manufacturing, the steps which comprise agitating alumina in an essentially aqueous slurry medium with a substantially water-insoluble compound selected from the group consisting of the carbonates, oxides and hydroxides of the iron transition group metals, molybdenum, tungsten and vanadium to deposit said metal on the alumina, separating solids from the aqueous medium, drying the separated solids, and calcining the dried material.

2. The method of claim 1 in which the alumina is particulate and finely divided and the solids are formed into larger particles after drying and before calcining.

3. The method of claim 1 in which the agitation is conducted at a temperature from about 125° to about 212° F.

4. The method of claim 1 in which substantially water-insoluble compounds of cobalt and molybdenum are agitated in the aqueous medium.

5. The method of claim 1 in which the substantially water-insoluble compound selected from the group consisting of the carbonates, oxides and hydroxides of the iron transition group metals, molybdenum, tungsten and vanadium, is a combination of (1) an iron transition group metal compound and (2) a compound of a metal selected from the group consisting of molybdenum, tungsten and vanadium, said compounds being selected from the group consisting of carbonates, oxides and hydroxides.

6. The method of claim 4 in which cobalt carbonate and molybdenum trioxide are employed.

7. The method of claim 4 in which the agitation is conducted at a temperature from about 125° to about 190° F.

8. The method of claim 5 in which the agitation is conducted at a temperature from about 125° to about 212° F.

References Cited in the file of this patent

UNITED STATES PATENTS

| | | |
|---|---|---|
| 1,139,592 | Spieler | May 18, 1915 |
| 1,399,807 | Scott | Dec. 13, 1921 |
| 2,101,104 | Smith et al. | Dec. 7, 1937 |
| 2,120,958 | Coons | June 14, 1938 |
| 2,211,022 | Michael | Aug. 13, 1940 |
| 2,658,858 | Lang et al. | Nov. 10, 1953 |
| 2,692,257 | Fletz | Oct. 19, 1954 |
| 2,750,261 | Ipatieff et al. | June 12, 1956 |